No. 713,717. Patented Nov. 18, 1902.
C. W. THOMPSON.
APPARATUS FOR FILTERING OR SEPARATING LIQUIDS FROM SOLIDS.
(Application filed Feb. 12, 1902.)
(No Model.) 5 Sheets—Sheet 1.
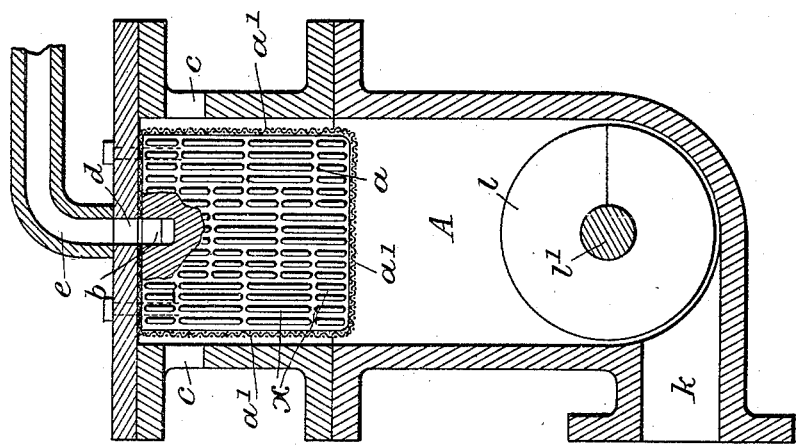
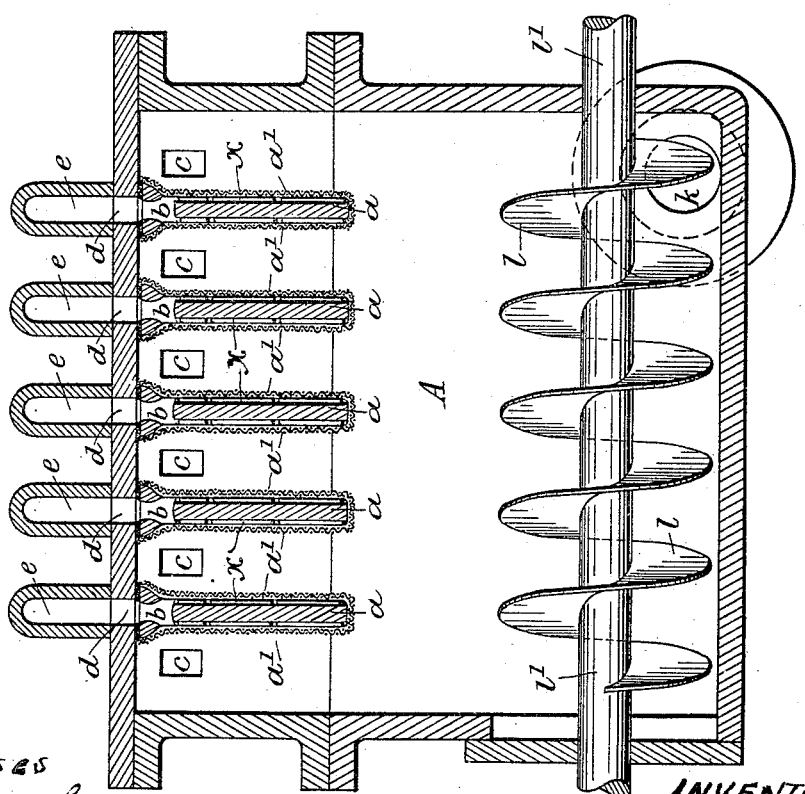
WITNESSES
F. W. Wright
Walter Abbe
INVENTOR
COURTENAY WILLIAM THOMPSON
BY Howson and Howson
HIS ATTORNEYS

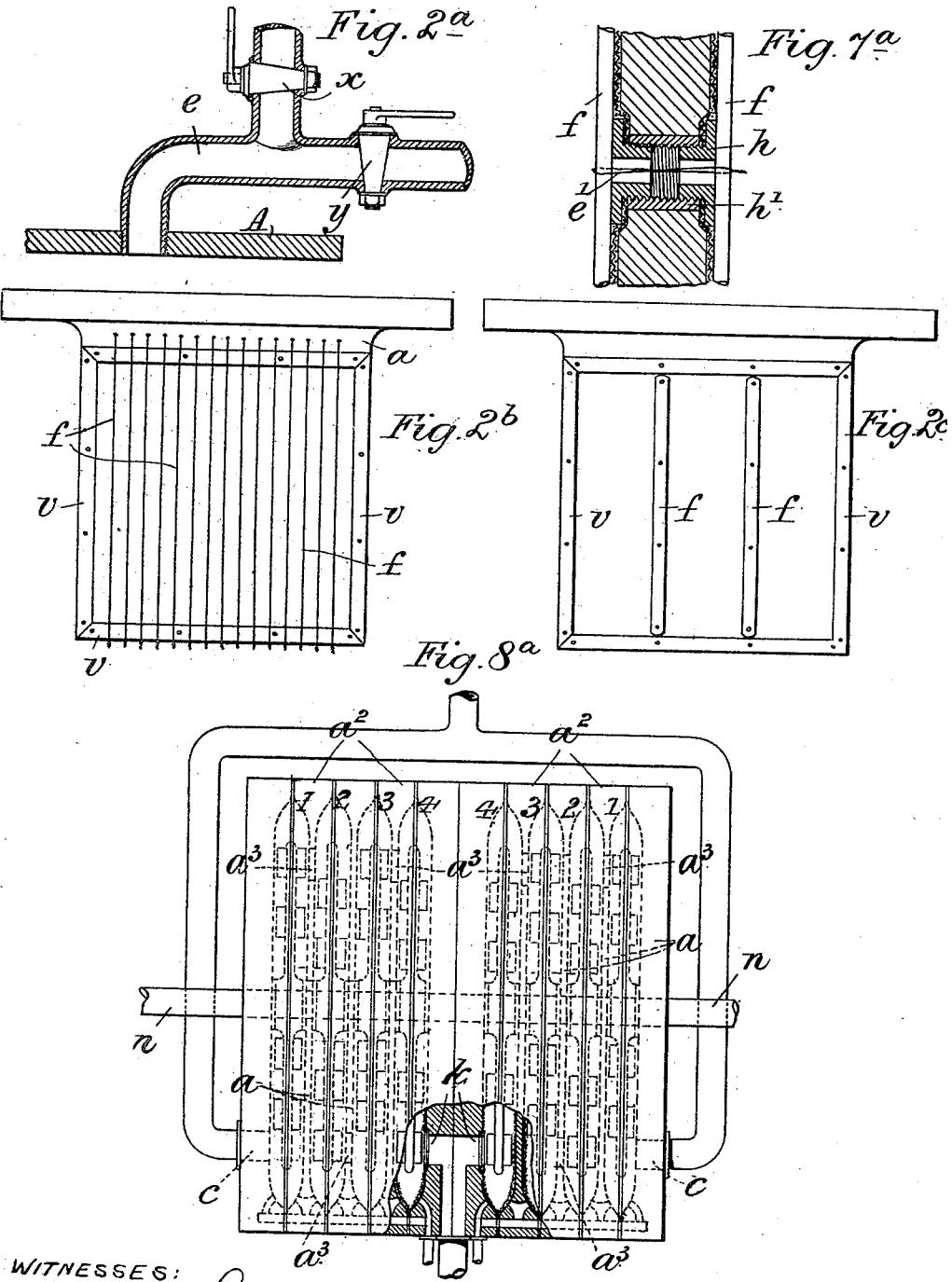

No. 713,717. Patented Nov. 18, 1902.
C. W. THOMPSON.
APPARATUS FOR FILTERING OR SEPARATING LIQUIDS FROM SOLIDS.
(Application filed Feb. 12, 1902.)
(No Model.)
5 Sheets—Sheet 3.
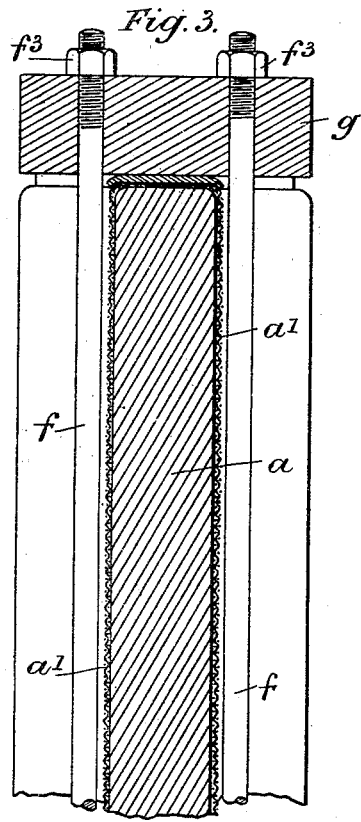
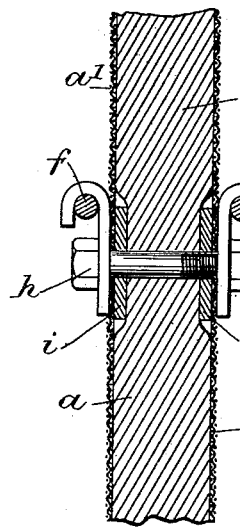
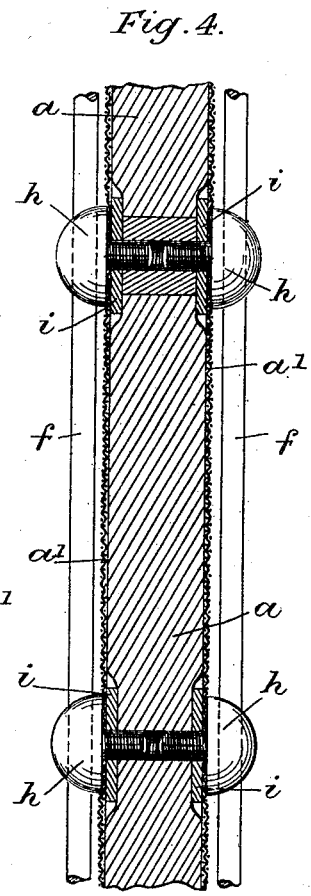
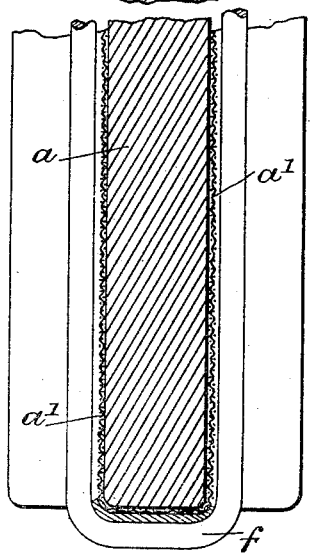
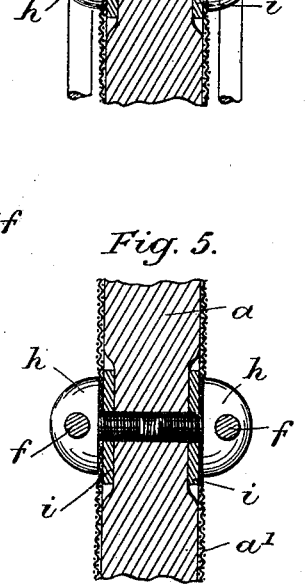
WITNESSES:
F. W. Wright
Walter Abb
INVENTOR
COURTENAY WILLIAM THOMPSON
BY Howson and Howson
HIS ATTORNEYS No. 713,717. Patented Nov. 18, 1902.
C. W. THOMPSON.
APPARATUS FOR FILTERING OR SEPARATING LIQUIDS FROM SOLIDS.
(Application filed Feb. 12, 1902.)

(No Model.) 5 Sheets—Sheet 4.

No. 713,717. Patented Nov. 18, 1902.
C. W. THOMPSON.
APPARATUS FOR FILTERING OR SEPARATING LIQUIDS FROM SOLIDS.
(Application filed Feb. 12, 1902.)
(No Model.) 5 Sheets—Sheet 5.

WITNESSES:
G. W. Wright
Walter Abbe

INVENTOR
COURTENAY WILLIAM THOMPSON.
By
Howson and Howson
HIS ATTORNEYS.

UNITED STATES PATENT OFFICE.

COURTENAY WILLIAM THOMPSON, OF LONDON, ENGLAND.

APPARATUS FOR FILTERING OR SEPARATING LIQUIDS FROM SOLIDS.

SPECIFICATION forming part of Letters Patent No. 713,717, dated November 18, 1902.

Application filed February 12, 1902. Serial No. 93,700. (No model.)

*To all whom it may concern:*

Be it known that I, COURTENAY WILLIAM THOMPSON, mining engineer, a subject of the King of Great Britain and Ireland, residing at 5 Fair street, Tooley Street, London, England, have invented certain new and useful Improvements in Apparatus for Use in Filtering or Separating Liquids from Solids; and I do hereby declare the following to be a full, clear, and exact description of the invention, such as will enable others skilled in the art to which it appertains to make and use the same.

My invention relates to apparatus for use in filtering or separating liquids from solids; and it has for its object to make the action of such apparatus continuous and so as to require less manual work than is required with filters as hitherto constructed.

Apparatus constructed in accordance with my invention is applicable for filtering purposes generally—such as, for instance, for treating ore-slimes or separating water from river silts, sewage, and other matters, so as to discharge the solid matter as free of liquid as desired.

I will describe my invention with reference to the accompanying drawings, which represent examples of manners in which my invention may be carried out in practice.

Figure 8:
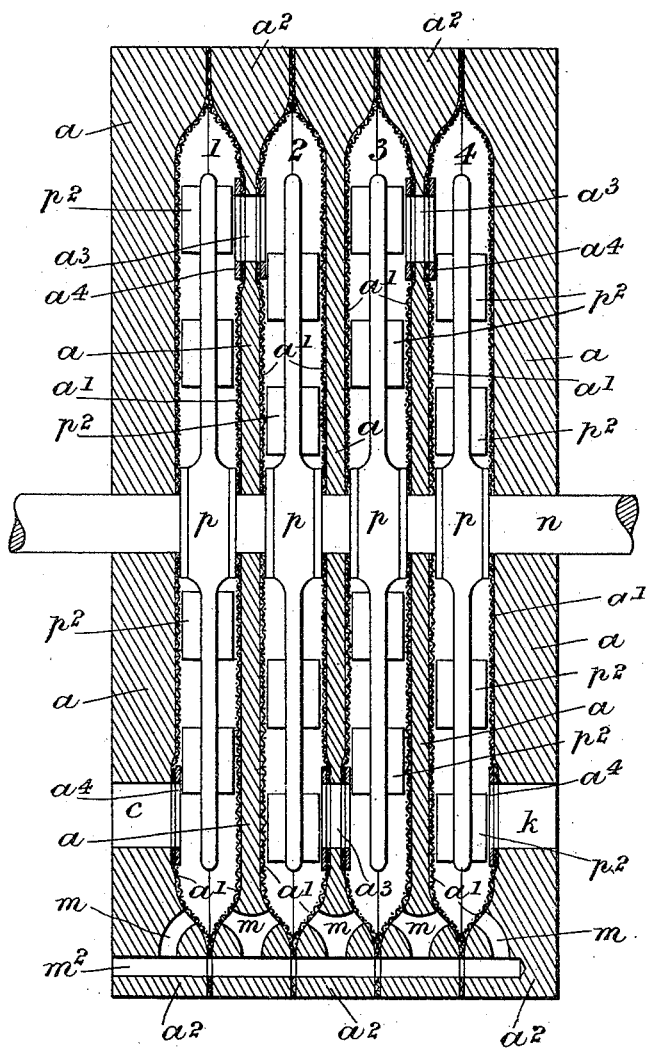

Figure 1 is a longitudinal sectional view of a filter-chamber illustrating my invention. Fig. 2 is a cross-section at right angles to Fig. 1. Fig. 2$^a$ is a sectional view showing the tap connections to the top of the filter-plates. Fig. 2$^b$ is an elevation showing means for securing the filter-cloth to the filter-plates. Fig. 2$^c$ is a modified form of cloth-fastener. Fig. 3 is a cross-section of one of the filter-plates. Fig. 4 is a detailed cross-section of means for securing the cloth to the filter-plates. Figs. 5, 6, 7, and 7$^a$ are detailed views of modifications of the device of Fig. 4. Fig. 8 is a central sectional view of a filter having a series of filtering-chambers. Fig. 8$^a$ is an outside view, partly broken away, of two such filters shown in Fig. 8 combined, so as to act together.

Referring first to Figs. 1 and 2, the filter consists of a chamber A, from the upper part of which filter-plates $a$, grooved in any ordinary or suitable way—as shown, for example, in Figs. 1 and 2 at $x$—are suspended, passages $b$ in the said plates affording communication between the grooves in the plates and openings $d$ in the cover of the chamber A, which openings are in communication with pipes or passages $e$, through which the liquid passes away after being filtered through the filter-cloths $a'$, which surround the plates $a$. The feed of the mixture of liquid and solid matter into the chamber A is effected through openings in the chamber—say between the plates $a$, as shown at $c$—the solid matter collecting on the cloths surrounding the plates. The plates $a$ may be flat, as shown, or they may be curved or set concentrically on the principle of filter-press plates, they presenting a large area in a small space. The chamber A is continued downward below the plates $a$, so as to form a considerable space below the said plates. When sufficient solid matter has collected on the filter-cloths, it or some of it must be removed, so that further solid matter may collect thereon, and this removal is done periodically, so that the solid matter falls into the space below the plates $a$. The whole space within the chamber A is of course filled with the mixture of liquid and solid matter to be filtered, and when solid matter is detached from the filter-cloths it falls through the said mixture without any considerable part of it becoming suspended therein and without materially interfering with the working of the filter, and thus the solid matter can be removed from the lower part of the chamber while filtering proceeds at the upper part of the same chamber. Various means may be employed for thus detaching the solid matter from the filter-cloths, provided the means be such that the solid matter falls and is not to any detrimental extent stirred into the mixture being filtered. For example, I may use (especially in cases where the filtering pressure of the filter is that of the atmosphere produced by suction) any suitable scraping or detaching tools, which may be arranged with suitable connections for operating them, or the cloths may be held back to the plates and fluid be forced in the reverse direction to that taken in filtering. For this purpose each pipe or passage $e$ is provided with a cock, a valve $y$, as shown in Fig. 2$^a$, a branch pipe from each of the said pipes $e$ being also provided with a cock or valve $x$, so that by shutting off the valve $y$ to prevent the discharge of the filtered liquid through the pipes or passages $e$ and opening the valve and to reverse the flow of fluid through the passages $b$ and through the cloths $a'$, so that the said fluid will force solid matter off the filter-cloths and cause it to fall away from the said cloths into the space below. The cloths may be held back to the plates by various means—for example, by wirework, as shown in Fig. $2^b$—the filter-cloth being secured at its edges to the plate $a$ by bars $v$, bolted to the said plate, the portion of the cloth located between these bars being held to the plate by wires $f$ passed through holes at the upper end of the plate, the said wires extending down both sides of the plate, the ends of each wire being twisted together at the bottom of the plate, so as to cause the said wires to press the cloth against the plate, or instead of the wires $f$, as shown in Fig. $2^b$, bars $f$, as shown in Fig. $2^c$, may be bolted to the plate $a$ at suitable distances apart between the bars $v$, or, as shown in Fig. 3, wires $f$ pass through a piece $g$ on each of the plates $a$, each wire forming a loop passing around the plate and along each side and strained tight by nuts $f^3$, screwed onto their ends projecting through the piece $g$, or the wires may be strained tight by twisting their ends together, as in Fig. $2^b$. When such wires are of considerable length or the wirework of large extent, as is the case with large plates, the said wires or wirework may be held back against the plates by studs $h$, having holes in their heads for the wires to pass through, as shown in Figs. 4, 5, and 6, or provided with hooks to hold the wires, as shown in Fig. 7, or the studs may be hollow axially, as shown in Fig. $7^a$, and fine wires $e'$ be passed through them to hold the main wires $f$. Such studs may be screwed into sleeves, such as $h'$, inserted in holes in the plates. As shown in Fig. 6 and at the lower part of Fig. 4, the studs are screwed into the plate $a$, or they may be screwed the one into the other from opposite sides of the plates, as shown in Fig. 6, or otherwise secured. The holes through the plates may be made of a diameter sufficient to receive filling-pieces, into which the studs are screwed, as shown in the upper part of Fig. 4. Washers $i$ are shown to make the necessary joint between the plates (or the filling-pieces or hollow studs) and the cloths, it being understood that wherever holes are made in the cloths good joints must be made around these holes, so as to prevent the passage of matter otherwise than through the cloths. The said washers $i$ may be received in recesses of larger diameter than the holes through the plates, as shown in the several figures. The operation of removing solid matter from the cloths may be repeated until sufficient solid matter has dropped and collected at the bottom of the chamber to be removed by discharge through an outlet or outlets at or near the bottom of the chamber. This outlet or these outlets (one is shown at $k$ in Fig. 1) may be regulated by a valve or valves, so that the solid matter may be discharged at any desired rate. The discharge of such solid matter may be facilitated by a conveyer or creeper $l$, which will convey the said matter to the outlet or outlets. This conveyer or creeper may be a continuous helix, (as shown in Fig. 1,) or it may have arms arranged helically on a rotatable shaft $l'$, or it may be of any other suitable kind. The said shaft $l'$ may be operated at any desired rate by any convenient mechanism, such as spur-gearing or a belt and pulleys.

Figure 9:
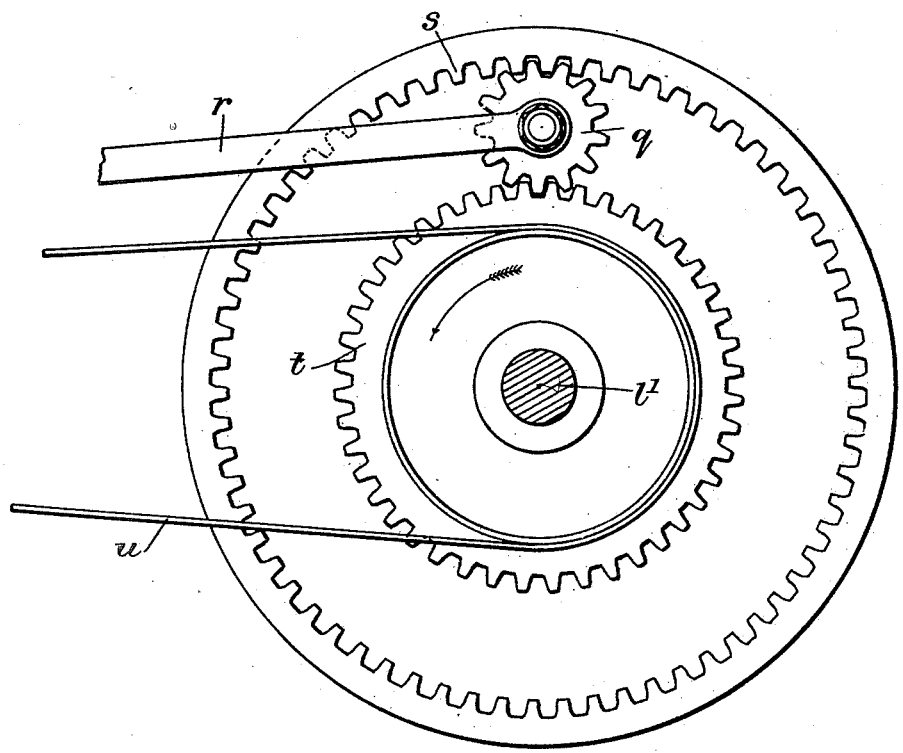

The shaft $l'$ may receive intermittent backward and forward movement, always a little more forward than backward, by an arrangement of gearing shown in Fig. 9, in which figure $q$ is a pinion carried on a rod $r$, to which reciprocating motion can be given by any suitable means. The said pinion $q$ is in gear with two concentric spur-wheels $s$ and $t$, having teeth inside and outside, respectively, the wheels $s$ being keyed to the shaft $l'$ of the conveyer or creeper $l$ and the wheel $t$ being loose on the said shaft $l'$, or the wheel $s$ may be loose and the wheel $t$ fast on the shaft. When the rod $r$, carrying the pinion $q$, is reciprocated and the wheel $t$ is stationary, the pinion will roll on the said wheel $t$ and impart to the wheel $s$ reciprocating motions of partial rotation and therethrough impart jerky reciprocating motions of partial rotation to the conveyer or creeper; but if a forward rotation be given to the loose spur-wheel by means of the chain or cord, as at $u$, it will impart to the pinion $q$ while the rod $r$ is moving in the opposite direction to the wheel $t$ an increased extent of rotation, and while the rod $r$ is moving in the same direction as that of the wheel $t$ a decreased extent of rotation will be imparted to the pinion $q$, and consequently there will be imparted to the conveyer or creeper through the wheel $s$ equivalent different extents of partial rotation, and thus intermittently expel the solid matter through the outlet $k$.

The aforesaid openings $b$ in the plates $a$ and openings $d$ in the cover of the chamber $A$ may be connected with any suitable ports, pipes, or passages; but I prefer to arrange them so as to connect each plate $a$ separately to a port, pipe, or passage provided with valves, as shown in Fig. $2^a$, or so connected in groups that solid matter can be removed from any one or more of the filter-cloths, as desired, and I may effect the removal by means of a supply of water under pressure somewhat in excess of that of the pressure of the entering mixture, so that by admitting such water in the direction the reverse of the direction of filtering solid matter can be removed from the cloths of either plate or any plates while the other plate or plates are filtering. By this means the feed of the mixture to be filtered can be practically continuous, only a portion of the filtering area being out of operation at a time.

I prefer to provide sufficient space between the bottoms of the plates $a$ and the conveyer or creeper $l$, as shown in Figs. 1 and 2, to allow the solid matter to drop through the mixture entirely free of the plates and to some little extra distance before it reaches the conveyer or creeper, so as to leave ample freedom for dropping solid matter and to prevent the said solid matter being stirred up again with the mixture, and thus I effectually perform the distinct operations of filtering and the removal of the solid matter within one chamber all by mechanical means and with economy and little or no handling. When the filtering-pressure is atmospheric pressure obtained by suction, the chamber A need not be closed at top.

The filtering apparatus may be constructed as follows and as illustrated, for example, in section in Fig. 8, while still keeping the thin feed of mixture separate from the thick or solid matter being discharged. The filtering-compartments are formed by grooved filtering-plates $a$, separated by surrounding rims $a^2$, which may be cast on the plates or formed separately therefrom or otherwise arranged—for example, as in ordinary filter-presses; but the plates $a$ have openings $a^3$ therein, so that when the said plates and rims are bolted together they form filtering-compartments 1 2 3 4, arranged in series or as a zigzag passage, in consequence of the openings $a^3$ giving communication between the compartments at or toward opposite ends of the said compartments alternately. Filtering-cloths $a'$ are applied to both sides of the compartments and are confined between the abutting rims $a^2$ (or between the rims and plates if they be formed separately) and also around the communicating openings $a^3$ by pinching-rings $a^4$. The mixture to be filtered enters the first compartment and the solid matter issues from the last compartment, the liquid passing away through the filtering-cloths and the grooves in the plates through passages $m$ into an outlet-passage $m^2$. There may be a separate pipe or passage or valve for each filtering-plate to enable the discharge to be cut off—supposing, for example, a plate to be defective.

A shaft $n$, passing centrally through the apparatus and revoluble by any suitable means, has fixed to it arms $p$, which carry scrapers or brushes $p^2$, which as the arms $p$ revolve in the filtering-compartments scrape or brush off the cloths solid matter which deposits thereon during filtration, and the said solid matter is thus passed into suspension again in the mixture, and I thereby can keep the cloths comparatively clean for continuous filtration. The scrapers or brushes may be of any convenient material and may be rigid or flexible—for instance, they may be plates of metal or they may be made of bristles. The scrapers or brushes on one arm in each filtering-compartment are preferably placed, as shown in the drawings, so as to act on certain parts of the cloths, while those on the other arm or arms in the same compartment are placed so as to clean the remaining parts of the cloths. By this means the scrapers or brushes on the arms occupy less space in each compartment. Owing to the openings for the passage of the mixture under treatment from one compartment to the next being arranged as described, the mixture must pass successively through the compartments, and the mixture thus gets thicker and thicker as it passes from compartment to compartment and ultimately thick solid matter is discharged at the final outlet $k$. By these means I keep the thin mixture and the thick matter from which liquid has been separated distinct from each other, as in the apparatus first described.

A pressure-filter comprising a large number of compartments may be constituted by two or more groups of compartments, as shown in Fig. 8$^a$, with a feed-opening $c$ for mixture at one end of each group, and a final outlet $k$ for solid matter at the other end of each group.

Having now particularly described and ascertained the nature of my said invention and in what manner the same is to be performed, I claim as my invention—

1. A filter, comprising a closed chamber, an opening in the bottom of the chamber and a conveyer adjacent to said opening, in combination with filter-plates in the upper part of the chamber and means to intermittently free the collected material on the filter-plates to cause it to fall in coagulated masses to the bottom of the chamber, substantially as described.

2. A filter, comprising a closed chamber, having inlet and outlet openings, filter-plates in the upper part of the chamber, a conveyer in the lower part, piping for carrying away the filtered liquid from the plates, and means for passing liquid back through the filter-plates to dislodge the collected material thereon, substantially as described.

3. A filter, comprising a closed chamber, an opening in the bottom of the chamber and a conveyer adjacent to said opening, in combination with filter-plates in the upper part of the chamber, means to intermittently free the collected material on the filter-plates to cause it to fall in coagulated masses to the bottom of the chamber, and means for actuating the conveyer backwardly and forwardly, but with greater forward motion than backward motion, substantially as described.

4. A filter having a closed chamber, grooved filter-plates in the top of the chamber, piping connected to the grooves, a cloth covering for the plate, means for drawing the filtered liquid off through the filter, in combination with means for forcing liquid back through the plates, to dislodge the collected material, means for holding the cloth to the plates during this reverse flow, and a conveyer in the bottom of the chamber, substantially as described.

5. A grooved filter-plate having a cloth covering, wires extending across, and on the outside of said covering, and studs secured to the face of the plate adapted to hold the wires, substantially as described.

6. A filter-plate having a cloth covering, wires extending across said covering, holes through the plate, a stud through the hole and adapted to support the wires on its outer ends, substantially as described.

7. A filter-plate having a cloth covering, wires extending across said covering, holes through the plate, a stud in the hole, washers in recessed openings in the plate on the inside of the filter-cloth and means for supporting the wires at the ends of the stud, substantially as described.

8. A filter-plate having a threaded stud passing through a hole in the plate, washers in recessed openings at the ends of the hole, a filter-cloth covering the plate and washers, and retaining-wires, said stud protruding beyond the cloth and carrying means for supporting the wires to hold the cloth in place, substantially as described.

In testimony whereof I affix my signature in presence of two witnesses.

COURTENAY WILLIAM THOMPSON.

Witnesses:
W. GERALD REYNOLDS,
JOHN E. NEWTON.